June 27, 1933.  D. H. HARNLY  1,915,278
WEATHER STRIP
Filed July 9, 1930
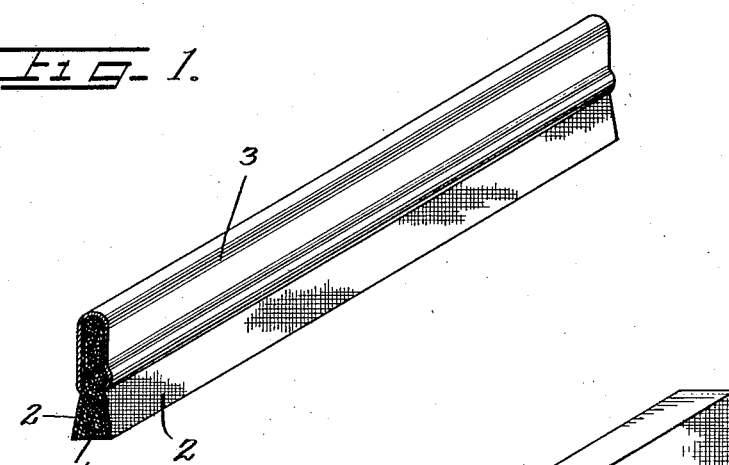
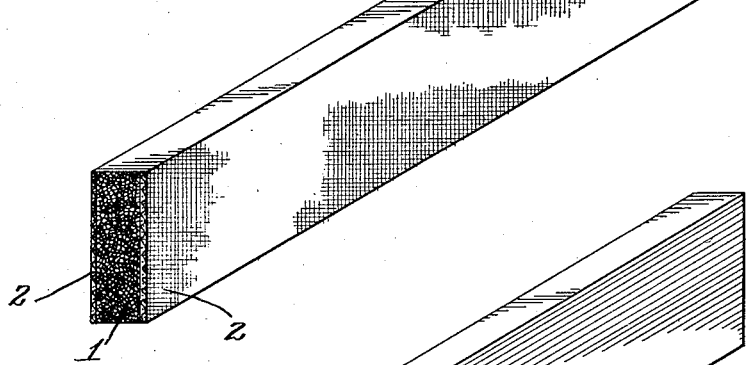
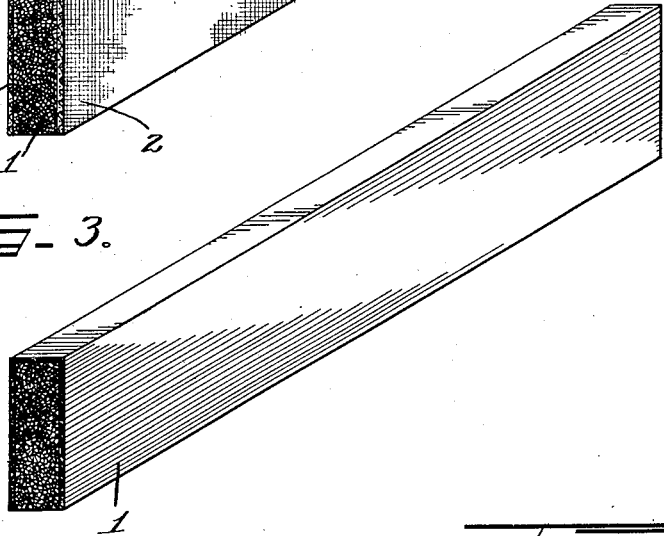
Inventor
David H. Harnly.
By: Charles H. Hill Attys.

Patented June 27, 1933

1,915,278

UNITED STATES PATENT OFFICE

DAVID H. HARNLY, OF CHICAGO, ILLINOIS

WEATHER STRIP

Application filed July 9, 1930. Serial No. 466,624.

This invention relates to a weather strip.

It has been found in practice that hard or stiff rubber when used for weather strips does not conform to inequalities or unevenness in the surface desired to be sealed, with the result that the weather will seep in under the strip due to such unevenness which results from sagging, decay and other causes, and what is known as sponge rubber that will readily conform to inequalities is too weak, pliable and elastic for such a purpose, and soon fails in use.

It is an object of this invention to provide a weather strip that will readily conform to the inequalities and unevenness in the surfaces to be sealed and that also possesses the proper amount of resiliency and durability.

More specifically, my invention consists of sponge rubber with a fabric facing that is frictioned with rubber or rubberized and integrally united with the sponge rubber by vulcanization or the like whereby the sponge rubber is stiffened and possesses resiliency and durability without destroying its respondence to inequalities.

The invention comprises the novel structure and combination of parts hereinafter described and more particularly pointed out in the appended claims.

In the accompanying drawing which illustrates a preferred form of this invention and in which similar reference numerals refer to similar features in the different views:

Figure 1 is a perspective view of a piece of weather strip partly encased involving this invention.

Figure 2 is a perspective view of the unencased weather strip showing the reinforcement thereon.

Figure 3 is a perspective view of a piece of weather strip before reinforcement involving this invention.

Referring now to the drawing: There is shown in Fig. 3, a strip of soft, pliable material, preferably of sponge rubber that will readily conform to inequalities or unevenness in the surface to be sealed when embodied in a weather strip. In this form the weather strip may be used for certain purposes, but it is generally too pliable for most purposes and does not possess the resiliency, strength and durability necessary, especially where frequent movement occurs.

In Fig. 2, the pliable weather strip is shown properly reinforced to give it the desired degree of resiliency and also durability without destroying the necessary pliability to conform to any ordinary uneven surface. While this reinforcement may assume various forms, a preferred form has been illustrated. According to the preferred form, a strip of rubberized fabric 2 is vulcanized upon each side of the rubber strip 1, so as to become substantially an integral part of the rubber or bonded thereto. Generally, the fabric strips are first frictioned with rubber upon each side or rubberized, and a piece of sponge rubber is inserted between such a pair of strips and the three parts vulcanized together under heat in a press so that the fabric strips become bonded or integrally united with the rubber.

These fabric strips reinforce the pliable strip 1 and reduce the pliability thereof in lateral directions and impart a certain amount of resiliency thereto for more quickly restoring the same after bending. This reinforcement, however, does not materially interfere with the downward pliability that is adapted for sealing an uneven surface.

In Fig. 1, the strip 1 is shown as partly encased in a metal sheath 3 which can readily be secured to a door, window or frame or the like and which forms a good support for the strip 1.

I am aware that many changes may be made, and numerous details of construction may be varied through a wide range without departing from the principles of this invention, and I therefore do not purpose limiting the patent granted herein, otherwise than necessitated by the prior art.

I claim as my invention:

1. A weather strip consisting of a strip of sponge rubber, and a reinforcing rubberized fabric strip vulcanized upon each side leaving one edge exposed for contacting relation with a surface to be sealed.

2. A weather strip consisting of a strip of sponge rubber, a reinforcing fabric strip vulcanized upon each side, and a casing partially embracing said strip leaving one edge of the sponge rubber exposed.

In testimony whereof I have hereunto subscribed my name at Chicago, Cook County, Illinois.

DAVID H. HARNLY.